United States Patent [19]

Fukasawa

[11] Patent Number: 5,262,812
[45] Date of Patent: Nov. 16, 1993

[54] BLADES ACTUATION DEVICE FOR LIGHT PATH

[75] Inventor: Yoshimi Fukasawa, Minamikoma, Japan

[73] Assignee: Nisca Corporation, Yamanashi, Japan

[21] Appl. No.: 927,912

[22] Filed: Aug. 12, 1992

[30] Foreign Application Priority Data

Aug. 30, 1991 [JP] Japan ............................. 3-077572[U]
Dec. 28, 1991 [JP] Japan ............................. 3-113156[U]

[51] Int. Cl.$^5$ .............................................. G03B 9/08
[52] U.S. Cl. .................................................. 354/234.1
[58] Field of Search ................. 354/234.1, 235.1, 271.1

[56] References Cited

FOREIGN PATENT DOCUMENTS 64-55031  4/1989 Japan .
1-267622 10/1989 Japan .

*Primary Examiner*—Michael L. Gellner
*Assistant Examiner*—Howard B. Blankenship
*Attorney, Agent, or Firm*—Kanesaka and Takeuchi

[57] ABSTRACT

Actuation device of the invention is used for opening and closing blades for defining light path, i.e. a diaphragm of a camera. The actuation device includes an axle with a permanent magnet, a frame for rotationally receiving the permanent magnet, a hollow magnetic circuit member to retain the frame, and a sensor. Actuation and brake coils are wound around the frame. The actuation coil operates to rotate the permanent magnet, while the brake coil operates to stop rotation of the permanent magnet operated by the actuation coil. The sensor senses the angular location of the permanent magnet. A plurality of terminal pins is arranged on the frame between the actuation and brake coils, so that the ends of both coils can be attached to the desired pins. Also, a printed board attached to the terminal pins is provided with test terminals thereon, so that the device can be tested without causing damage to a terminal section of the printed board.

10 Claims, 4 Drawing Sheets

BLADES ACTUATION DEVICE FOR LIGHT PATH

BACKGROUND OF THE INVENTION AND RELATED ART STATEMENT

The present invention relates to an actuation device for opening and closing blades for defining a light path, i.e. diaphragm or stop, of a camera.

Conventionally, the light path for a camera is defined by a plurality of blades for constituting a diaphragm, which are moved by an actuation device attached to the blades. A conventional actuation device including the actuation device and the blades is shown in Japanese Utility Model Publication (KOKAI) No. 64-55931 published on Apr. 6, 1989.

As shown in FIGS. 1 and 2, the conventional actuation device A is formed of a permanent magnet 1 with an axle 2 attached to the magnet 1, and a frame 4 formed of frame portions 4a, 4b. Each of the frame portions 4a, 4b includes a central hole portion h, upper and lower hole portions d1, d2 and a groove e. The magnet 1 is disposed in the central hole portion h, and the axle 2 is disposed in the upper and lower hole portions d1, d2. Washers 3a, 3b are attached to the frame 4 for holding the axle 2. When assembled, the magnet 1 is rotationally retained inside the frame 4, and the frame 4 is situated inside a hollow magnet circuit member or yoke 7.

Actuation and brake coils (not shown) are situated in the grooves e. For example, the actuation coil for providing rotational force to the permanent magnet 1 is wound around the groove e in the frame portion 4a, while the brake coil for providing brake force to prevent rotation of the permanent magnet 1 actuated by the actuation coil is wound around the groove e in the frame portion 4b.

The frame portion 4a is provided with pins 5a, 5b for connecting ends of the actuation coil, while the frame portion 4b is provided with pins 6a, 6b for connecting ends of the brake coil. At a portion c of the frame 4b, a magnetic sensor 8 for sensing an angular position of the magnet 1 is situated. The sensor 8 is fixed on a printed board 9 placed on the frame 4 and connected to the pins 5a, 5b, 6a, 6b.

When the device A is assembled, the frame portions 4a, 4b are connected together after the magnet 1 is situated in the hole h. Then, the pins 5a, 5b, 6a, 6b are placed onto the frame 4, and the actuation and brake coils are wound in the grooves e. Thereafter, the printed board 9 is placed over the frame 4. Finally, the assembled frame 4 is inserted into the hollow magnet circuit member 7.

In the device A, since the pins 5a, 5b, 6a, 6b are situated on the respective frame portion 4a, 4b, the pins can not be freely arranged on the frame. The ends of the coil at the frame portion 4a must be attached to the pins 5a, 5b, while the ends of the coil at the frame portion 4b must be attached to the pins 6a, 6b.

Further, since the pins 6a, 6b are attached to the periphery of the frame 4b, the length L2 is inevitably smaller than the length L1 of an attaching portion for the sensor 8. Therefore, in the device A, the printed board 9 must be attached to the frame 4 before the frame 4 is inserted into the magnet circuit member 7. Also, the printed board 9 must be bent when the sensor 8 is inserted into the magnet circuit member 7. Thus, the automatic assembly of the device A can not be made at this portion.

Moreover, in the device A, the frame 4 is divided along the center of the axle 2, so that the small holes d1, d2 can not sufficiently hold the axle 2 and requires washers 3a, 3b to hold the axle 2. Also, when the coils are wound in the grooves e, the coils may slip inside the grooves to thereby cut the coil at an edge of the groove.

Thus, the Japanese Utility Model Publication (KOKAI) No. 64-55931 is not fully satisfactory.

Japanese Patent Publication (KOKAI) No. 54-49512 and No. 1-267622, also, disclose actuators for diaphragms of cameras, wherein a frame for a permanent magnet is divided horizontally into two parts, and terminals for receiving ends of coils are attached at a periphery of the frame. Japanese Utility Model Publication 62-197133 also shows the Similar device.

In the conventional devices, the terminals are all located at a periphery of the frame. Therefore, the arrangements of the coils, the pins and the conducting members on the printed board are inevitably limited. Also, assembly of the device is not easily or automatically made.

The present invention has been made in view of the drawbacks of the conventional actuation devices for the diaphragms of the cameras.

Accordingly, one object of the invention is to provide an actuation device for blades of light path or diaphragm of a camera, wherein pins for receiving ends of coils are arranged in a middle portion on a frame so that the ends of the coils can be attached to the desired pins.

Another object of the invention is to provide an actuation device as stated above, wherein a printed board with a magnet sensor can be easily assembled with the actuation device.

A further object of the invention is to provide an actuation device as stated above, wherein coils can be stably wound in required grooves without slipping and cutting of the coils.

A still further object of the invention is to provide an actuation device as stated above, wherein the arrangement of conducting members on a printed board attached to the actuation device can be made easily.

A still further object of the invention is to provide an actuation device as stated above, wherein the assembled device can be easily inspected without impairing a part of a printed board.

A still further object of the invention is to provide an actuation device as stated above, which can be easily and automatically assembled.

Further objects and advantages of the invention will be apparent from the following description of the invention.

SUMMARY OF THE INVENTION

An actuation device of the invention is designed to open and close blades for defining light path, i.e. diaphragm of a camera.

The actuation device is formed of an axle to be attached to the blades for opening and closing the same, a permanent magnet fixed to the axle, a frame for freely and rotationally receiving the permanent magnet therein, and a hollow magnetic circuit member or yoke for receiving the frame therein. An actuation coil and a brake coil are attached to or wound on the frame. The actuation coil provides rotational force to the permanent magnet when energized, while the brake coil provides brake force to prevent rotation of the permanent magnet actuated by the actuation coil.

Also, a magnetic sensor is situated between the frame and the magnetic circuit member for sensing angular position of the permanent magnet inside the frame.

The frame includes first and second ends, and first and second portions. The first and second ends extend in an axle direction, while the first and second portions face against each other relative to a plane extending through the axle. One end of the axle extends outwardly through the second end to move the blades.

A plurality of terminals is attached to the first end of the frame for fixing the ends of the actuation and brake coils. The terminals are situated between the actuation and brake coils so that the assembly of the actuation device is made easily.

Namely, in the actuation device, the terminals are located between the first and second portions, and project outwardly from the first end. Since the terminals are situated in the middle of the frame, not the outer periphery of the frame, the ends of the coils can be attached to any terminals. Therefore, conducting members on a printed board can be easily arranged as required.

In this respect, if the terminals are located at one end or side near the outer periphery of the frame, the ends of the coils must be attached to the specific terminals, and the location of the conducting members on the printed board is almost determined without selection. Therefore, it is very difficult to change the design effecting the locations of the conducting members and terminals.

In the actuation device of the invention, the frame further includes rectangular grooves at the respective first and second portions for retaining the actuation and brake coils. Slip preventing devices, i.e. projections, are formed at least partly in the bottom portions of the grooves. Therefore, the coils wound around the frame do not slip in the grooves to smoothly wind the coils, which also prevents cutting of the coils by slipping when winding.

In the invention, the frame further includes a sensor receiving portion and a guide groove at one side thereof. The guide groove has a width as in the sensor receiving portion. Therefore, after the frame is inserted into the hollow magnetic circuit member, the sensor is inserted into the sensor receiving portion through the guide groove. Accordingly, assembly of the device can be easily made.

In the invention, further, the printed board attached to the terminals is provided with a plurality of inspection terminals in a middle of the printed board. Therefore, the actuation device can be inspected without using connecting portions of the printed board to thereby prevent damage of the connecting portions when inspected.

DETAILED DESCRIPTION OF PREFERRED EMBODIMENTS

Figure 1:
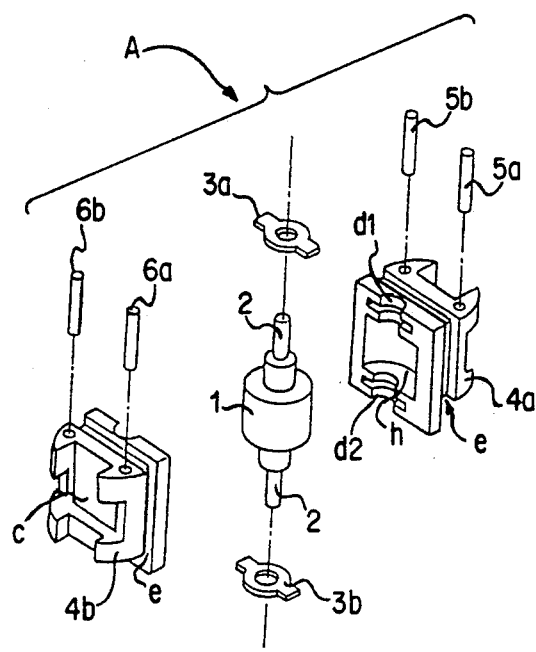
FIG. 1 is an exploded view of a main part of a conventional actuation device.
Figure 2:
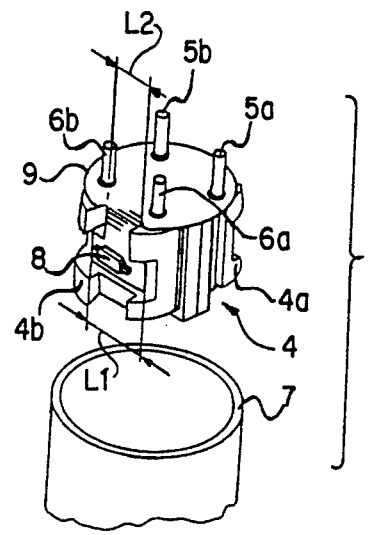
FIG. 2 is a perspective view for showing that the main part as shown in FIG. 1 is assembled with a magnetic circuit member.
Figure 3:
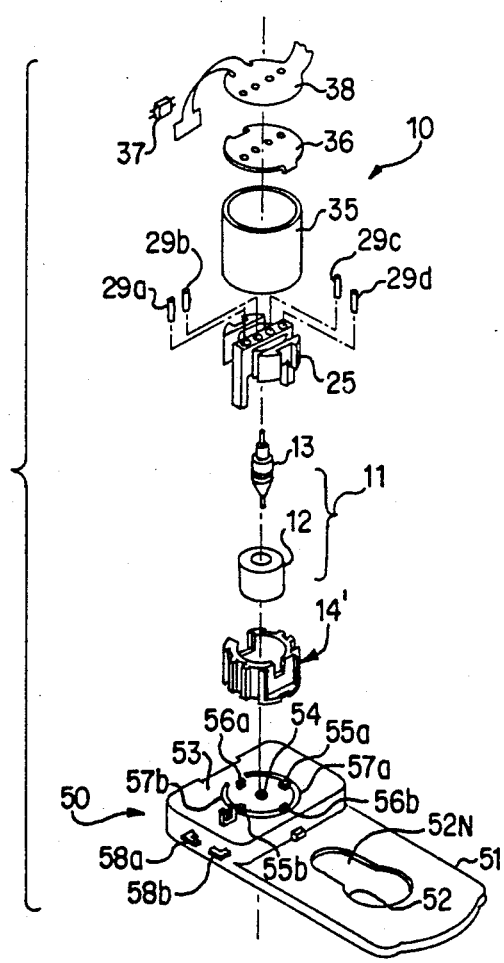
FIG. 3 is an exploded view of an actuation device with a diaphragm portion of the invention.
Figure 5:
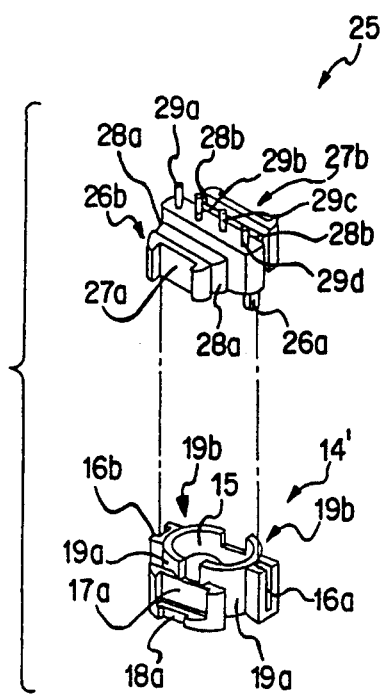
FIG. 5 is a perspective view of a frame separated from each other.
Figure 6:
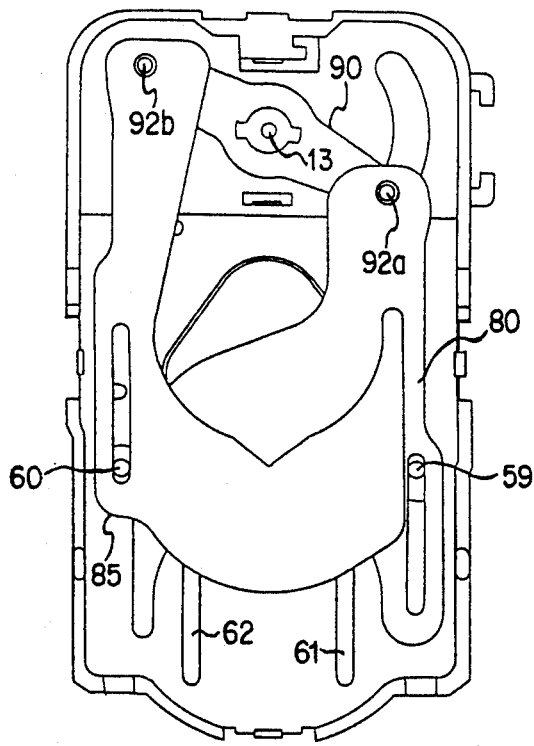
FIG. 6 is a bottom view of the diaphragm portion, wherein a rear cover is removed.
Figure 7:
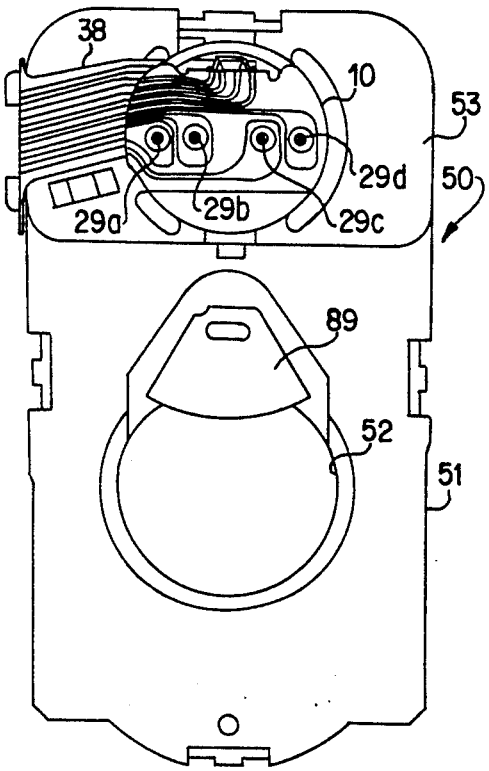
FIG. 7 is a plan view of the actuation device with the diaphragm portion and a printed board.

Referring to FIG. 3, an actuation device 10 of the invention for operating a diaphragm portion 50 is shown, wherein the actuation device 10 is exploded into parts. Also, the parts of the actuation device are shown in FIGS. 5 and 8.

Figure 8:
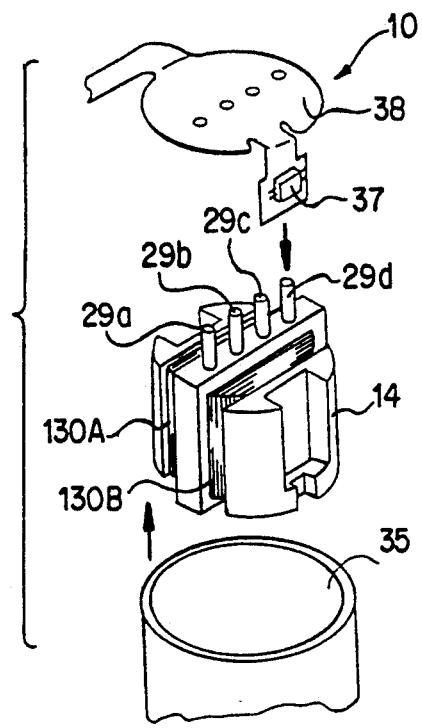
FIG. 8 is an explanation view for assembling the actuation device.

As shown in FIGS. 3 and 8, the actuation device 10 is basically formed of a permanent magnet assembly 11, a frame 14 for rotationally retaining therein the magnet assembly 11, an actuation coil 130A, a brake coil 130B, both coils being wound around the frame 14, a magnet circuit member or yoke 35 for receiving the frame 14 therein, a magnetic sensor 37 and a printed board 38 for holding the magnetic sensor 37.

The actuation coil 130A operates to provide rotational force to the magnet assembly 11 situated inside the frame 14 when energized, while the brake coil 130B operates to provide brake force to prevent rotation of the magnet assembly 11 rotated by the actuation coil 130A. The yoke 35 operates to conduct magnetic flux of the magnet assembly 11. An end plate 36 is attached to the yoke 35 for holding the frame 14 and closing one end of the yoke 35.

The magnetic sensor 37 is attached to the printed board 38 and is situated between the yoke 35 and the frame 14. The magnetic sensor 37 operates to sense an angular position of the magnet assembly 11 held inside the frame 14.

In particular, the magnet assembly 11 is formed of a cylindrical permanent magnet 12, and an axle 13 fixed to the magnet 12. The magnet assembly 11 is rotationally retained inside the frame 14 while a lower portion of the axle 13 extends outwardly through the frame 14.

The frame 14 is formed of a lower portion 14' and an upper portion 25. As clearly shown in FIG. 5, the lower portion 14' includes a space 15 for receiving the permanent magnet 12 therein, and a pair of engaging grooves 16a, 16b at an outer surface thereof. The engaging grooves 16a, 16b operate to engage the upper portion 25, but the engaging grooves 16a, 16b also engage engaging projections 55a, 55b of a base plate 51 at the diaphragm portion 50.

The lower portion 14' also includes sensor receiving portions 17a, 17b (17a is only shown) at the outer surface between the engaging grooves 16a, 16b. The sensor 37 may be placed in either side of the sensor receiving portions 17a, 17b. Further, engaging grooves 18a, 18b (18a is only shown) for engaging engaging projections 56a, 56b of the base plate 51 are formed under the sensor receiving portions 17a, 17b.

At portions between the engaging grooves 16a, 16b and the sensor receiving portions 17a, 17b, coil receiving portions or grooves 19a, 19b are formed.

The upper portion 25 is provided with a pair of engaging projections 26a, 26b engaging the engaging grooves 16a, 16b, and sensor inserting portions 27a, 27b having the widths as in the sensor receiving portions 17a, 17b. Further, coil receiving portions or grooves 28a, 28b are formed at portions corresponding to the coil receiving portions 19a, 19b.

Figure 9:
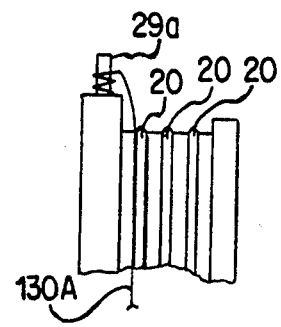
FIG. 9 is a side view of a part of the frame.
Figure 10:
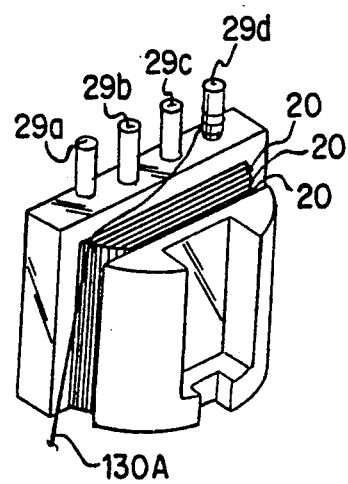
FIG. 10 is a perspective view of a part of the frame.

As shown in FIGS. 9 and 10, a plurality of projections 20 is formed in the bottom of the coil receiving portions 19a, 19b, 28a, 28b. The projections 20 operate to prevent the coils from slipping inside the coil receiving portions when the coils are installed. In this respect, if the projection 20 are not formed inside the coil receiving portions, the coils may not be located at the intended portions, which results in cutting the coils.

Terminal pins 29a, 29b, 29c, 29d for connecting the ends of the coils 130A, 130B to the printed board 38 are fixed in the middle of the coil receiving portions 28a, 28b of the upper portion 25. The ends of the coils may be attached to the desired terminal pins 29a, 29b, 29c, 29d.

When the actuation device 10 is assembled, at first, the axle 13 is inserted into the permanent magnet 12 to form the magnet assembly 11. Thereafter, the magnet assembly 11 is situated into the lower portion 14' such that the lower portion of the axle 13 passes through the lower portion 14'. Then, the upper portion 25 is placed onto the lower portion 14' to allow the magnet assembly 11 to rotate freely inside the frame 14 while the engaging grooves 16a, 16b engage the engaging projections 26a, 26b.

After the frame 14 is completed, the coils 130A, 130B are wound around the pairs of the coil receiving portions 19a, 19b, 28a, 28b of the frame 14. The ends of the coils 130A, 130B are connected to the predetermined terminal pins 29a, 29b, 29c, 29d. The connections of the coils to the terminal pins may be changed based on the arrangement of conducting members on the printed board 38. Thereafter, a tape (not shown) is wound over the coils 130A, 130B for shielding between the coils 130A, 130B and the yoke 35.

In this condition, the frame 14 is fixed onto the base plate 51 to engage the engaging groove 16a, 16b, 18a, 18b with the engaging projections 55a, 55b, 56a, 56b. Then, the yoke 35 is placed over the frame 14, and the end plate 36 is put on the yoke 35. The terminal pins 29a, 29b, 29c, 29d project outwardly through the end plate 36.

Thereafter, the printed board 38 with holes for engaging the terminal pins 29a, 29b, 29c, 29d is placed over the end plate 36 to engage the terminal pins. At this time, the magnetic sensor 37 attached to the printed board 38 is inserted into the sensor receiving portion 17a through the sensor inserting portion 27a. Finally, the terminal pins 29a, 29b, 29c, 29d are connected to the printed board 28 by soldering.

The diaphragm portion 50 that the actuation device 10 is attached to is shown in FIGS. 3, 4, 6 and 7. The diaphragm portion 50 is formed of the base plate 51, blades 80, 85, a support plate 70, and an operation lever 90.

Figure 4:
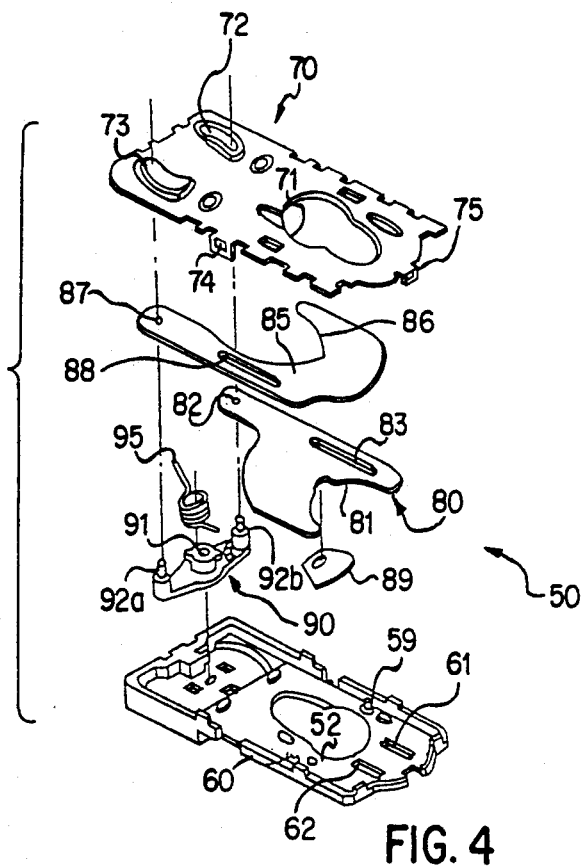
FIG. 4 is an exploded view of the diaphragm portion shown from a bottom.

As explained before, the base plate 51 includes an attaching portion 53 having the engaging projections 55a, 55b, 56a, 56b for engaging the frame 14. Also, the base plate 51 includes ribs 57a, 57b for holding the yoke 35, projections 58a, 58b for holding the printed board 38, a hole 54 for allowing the axle 13 to pass therethrough and a hole 52 with a portion 52N. As shown in FIG. 4, at a bottom side of the base plate 51, there are provided projections 59, 60 for engaging the blades 80, 85, and ribs 61, 62 for forming a space relative to the blades 80, 85.

The operation lever 90 includes a hole 91 for engaging the axle 13 passing through the hole 54 of the base plate 51, and pins 92a, 92b for engaging the blades 80, 85. A spring 95 is attached between the lever 90 and the base plate 51 to urge the lever 90 in one direction.

The blade 80 is made of a black polyester resin, and includes a curved portion 81, a hole 82 for engaging the pin 92b, and an elongated hole 83 for engaging the projection 59. A filter 89 for adjusting an amount of light when forming a small hole in the diaphragm is attached to the blade 80.

The blade 85 is made of a black polyester resin, and includes a curved portion 86, a hole 87 for engaging the pin 92a, and an elongated hole 88 for engaging the projection 60. The support plate 70 includes a hole 71, curved holes 72, 73 for receiving the pins 92a, 92b of the lever 90, and projections 74, 75 for engaging the base plate 51.

In the diaphragm portion 50, the blades 80, 85 are slidably situated between the base plate 51 and the support plate 70, and are connected to the lever 90. Therefore, when the lever 90 is rotated by the magnet assembly 11 connected thereto, the blades 80, 85 move linearly to provide a desired size of opening defined by the curved portions 81, 86 of the blades 80, 85. The spring 95 urges the blades 80, 85 to close the light path when the actuation device 10 is not actuated.

Figure 11:
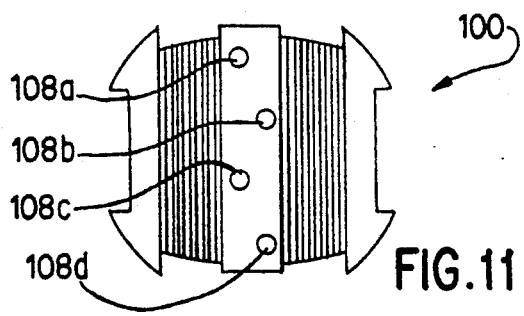
FIG. 11 is a plan view of a second embodiment of the frame of the invention.

In the actuation device 10 explained before, the terminal pins 29a, 29b, 29c, 29d are arranged linearly between the coils 130A, 130B. However, as shown in FIG. 11, terminal pins may be arranged in staggered relation between the coils. When the terminal pins 108a, 108b, 108c, 108d are arranged in the staggered relation, the distances between the pins become wide, so that the ends of the coils can be easily attached to the terminal pins 108a–108d.

Figure 12:
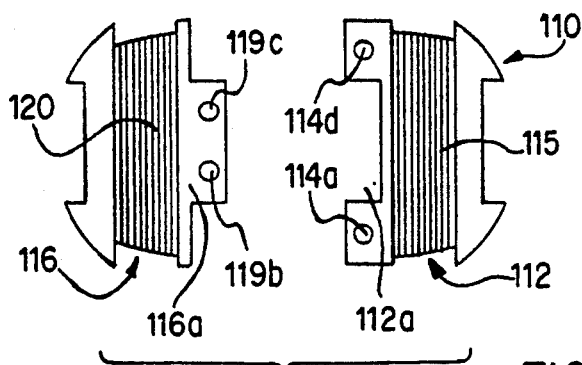
FIG. 12 is a plan view of a third embodiment of the frame separated from each other.

Also, in the actuation device 10 explained before, the frame 14 is divided into the upper and lower portions. However, as shown in FIG. 12, the frame 110 may be divided into lateral portions 112, 116. The portion 112 includes an upper recess 112a and a lower projection 112b (not shown), while the portion 116 includes an upper projection 116a and a lower recess 116b (not shown). The projection 116a engages the recess 112a, and the projection 112b engages the recess 116b. Since the projections 116a, 112b are respectively located in the center of the frame, the axle 13 can be properly held inside the frame 110. The portions 112, 116 can be easily assembled together.

Also, the portion 112 includes terminal pins 114a, 114d, and the portion 116 includes terminal pins 119b, 119c. When the portions 112, 116 are combined, the terminal pins 114a, 114d, 119b, 119c are aligned in the center between coils 115, 120. The frame 110 operates as in the frame 14.

Figure 13:
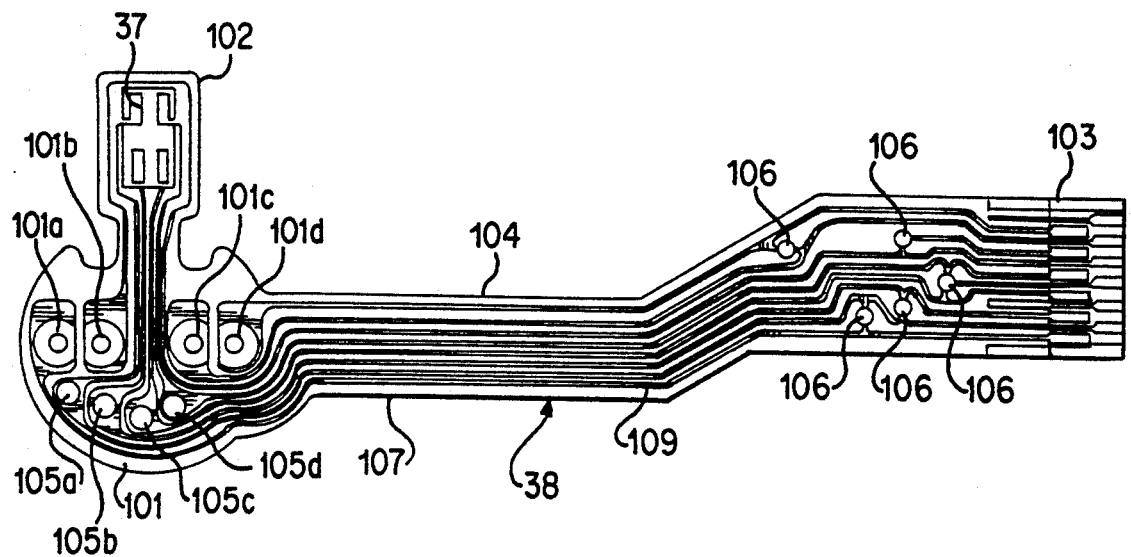
FIG. 13 is a plan view of the printed board.

FIG. 13 shows the printed board 38 used in the present invention. The printed board 38 is formed of a base plate 107 and conducting portions 109, and has a connecting section 101, a sensing section 102, a terminal section 103 and an extension section 104 situated between the connecting section 101 and the terminal section 103.

The connecting section 101 is to be located above the frame 14, and includes pin holes 101a, 101b, 101c, 101d for receiving therein the terminal pins 29a, 29b, 29c, 29d, respectively. The sensing section 102 receives thereon the magnetic sensor 37 thereon. The terminal section 103 is connected to a connector communicating with a control section of a camera.

In the printed board 38, inspection terminals 105a, 105b, 105c, 105d are formed at the conducting portions 109 between the magnetic sensor 37 and the terminal section 103. The inspection terminals 105a-105d are located near the pin holes 101a-101d.

When the printed board 38 is formed, a thin metal foil is attached to a basic film, and then, the conducting portions with desired pattern are formed by a known method, such as photo etching. Then, solder plating is formed at the terminal section 103, and a cover layer is formed to protect the conducting portions 109 except the pin holes 101a-101d, the inspection terminals 105a-105d and the terminal section 103.

In FIG. 13, holes 106 are formed for insulating between the conducting portions 109, which was used when the solder plating was formed at the terminal section 103.

Conventionally, after the actuation device 10 is coupled to the diaphragm portion 50 and the printed board 38, the assembly is tested before installing in a camera. At the test, generally, the terminal section 103 is inserted into a connector for testing. However, since the solder plating at the terminal section 103 is soft, the terminal section 103 is liable to be damaged by the connector for testing.

It is not preferable that the new product is injured by test. Further, the terminal section 103 may actually be damaged by the test, so that when the terminal section 103 is connected to the terminal of the camera, the terminal section 103 may not be properly connected.

In the printed board 38 of the present invention, since the printed board 38 includes the inspection terminals 105a-105d, the terminal section 103 need not be connected to the connector for testing. Test pins for the magnetic sensor 37 may be attached to the inspection terminals 105a-105d, and test pins for the coils 130A, 130B may be attached to the pins 29a-29d. The actuation device 10 and the diaphragm portion 50 are properly tested without using the terminal section 103.

Figure 14:
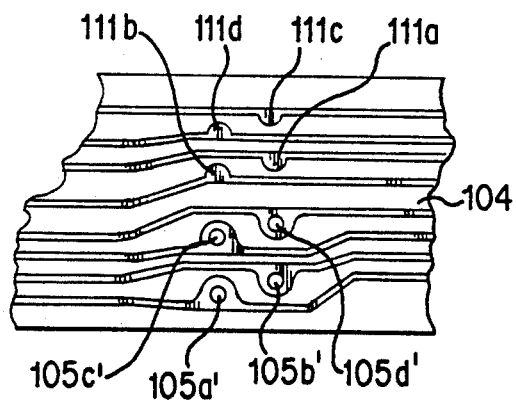
FIG. 14 is an enlarged plan view of a part of a second embodiment of the printed board.

In the printed board 38 of the invention, the inspection terminals 105a-105d are formed near the pins 29a-29d. However, the inspection terminals 105a'-105d', may be formed at the extension section 104, as shown in FIG. 14. Inspection terminals 111a-111d for the coils 130A, 130B may also be formed at the extension section 104.

In the present invention, the terminal pins are arranged on the frame between the actuation and brake coils, so that the ends of the coils may be connected at the desired pins. As a result, the arrangement of the conducting members on the printed board may be changed easily based on the arrangement at the terminal section.

In the present invention, the magnetic sensor attached to the printed board may be installed at the final stage of assembly. Therefore, the assembly of the device can be easily made. Also, the coils may be automatically installed on the frame without slipping and cutting thereof. Further, the printed board can be tested without causing damage on the terminal section.

While the invention has been explained with reference to the specific embodiments of the invention, the explanation is illustrative, and the invention is limited only by the appended claims.

What is claimed is:

1. An actuation device for opening and closing blades for defining light path, comprising:
   an axle adapted to be attached to the blades for opening and closing the blades by rotation thereof,
   a permanent magnet fixed to the axle,
   a frame for freely rotationally receiving the permanent magnet therein, said frame having first and second ends in an axile direction and first and second portions facing against each other relative to a plane extending through the axle, one end of the axle extending outwardly through the second end,
   an actuation coil wound around the first portion of the frame for providing rotational force to the permanent magnet when energized,
   a brake coil wound around the second portion of the frame for providing brake force to prevent rotation of the permanent magnet actuated by the actuation coil,
   a magnetic sensor attached to one of the first and second portions of the frame for sensing angular position of the permanent magnet inside the frame,
   a hollow magnetic circuit member for receiving therein the frame having the actuation and brake coils and the magnetic sensor, and
   a plurality of terminals attached to the first end of the frame for fixing ends of the actuation and brake coils, said terminals being located between the actuation and brake coils so that assembly of the actuation device can be easily made.

2. An actuation device according to claim 1, wherein said frame is divided into a first end portion where the terminals are attached, and a second end portion where the axle penetrates, said first and second end portions being connected together.

3. An actuation device according to claim 1, wherein said frame is divided into the first and second portions, said first and second portions being connected together.

4. An actuation device according to claim 1, wherein said frame further includes rectangular grooves at the respective first and second portions for retaining the actuation and brake coils, said grooves having slip preventing devices therein so that the coils wound inside the grooves do not slip in the grooves.

5. An actuation device according to claim 4, wherein said slip preventing devices are projections situated in bottom portions of the grooves.

6. An actuation device according to claim 1, wherein said frame further includes a sensor receiving portion at one of the first and second portions, said sensor receiving portion facing the magnetic circuit member when assembled and having a guide groove extending at least to the first end of the frame, said guide groove having a width as in the sensor receiving portion so that the sensor is inserted into the sensor receiving portion through the guide groove after the frame is situated inside the hollow magnetic circuit member.

7. An actuation device according to claim 1, further comprising a printed board attached to the terminals for electrically connecting the actuation and brake coils and the magnetic sensor to a control mechanism of the blades.

8. An actuation device according to claim 7, wherein said printed board includes a base, a plurality of conducting members imprinted on the base, first connecting portions connected to the conducting members and formed at an end of the base, and inspection terminals formed in a middle of the base so that the actuation device is inspected through the inspection terminals without using the first connecting portions.

9. An actuation device according to claim 8, wherein said printed board further includes second connecting portions to be fixed to the terminals attached to the frame, said inspection terminals being located adjacent to the second connecting portions so that when the second connecting portions are fixed to the terminals, the inspection terminals are located on the first end of the frame.

10. An actuation device according to claim 9, wherein said magnetic sensor is fixed on the printed board, said inspection terminals being formed at the conducting members communicating with the magnetic sensor.

* * * * *